United States Patent [19]

Mafoti et al.

[11] Patent Number: 5,516,872
[45] Date of Patent: May 14, 1996

[54] PREPARATION OF CAST ELASTOMERS USING AMINOCROTONATE-TERMINATED POLYETHER CHAIN EXTENDERS

[75] Inventors: Robson Mafoti, Pittsburgh; Alan D. Bushmire, Bridgeville, both of Pa.

[73] Assignee: Bayer Corporation, Pittsburgh, Pa.

[21] Appl. No.: 270,605

[22] Filed: Jul. 5, 1994

[51] Int. Cl.$^6$ .................................................. C08G 18/10
[52] U.S. Cl. ........................ 528/60; 528/59; 528/61; 528/64; 528/75
[58] Field of Search ............................. 528/59, 60, 61, 528/64, 75

[56] References Cited

U.S. PATENT DOCUMENTS

| | | |
|---|---|---|
| 3,666,726 | 5/1972 | Grogler et al. . |
| 5,066,824 | 11/1991 | Mafoti et al. . |
| 5,079,327 | 1/1992 | Sarpeshkar et al. ................ 528/59 |
| 5,079,328 | 1/1992 | Sarpeshkar et al. ................ 528/59 |
| 5,081,204 | 1/1992 | Sarpeshkar et al. ................ 528/59 |
| 5,081,210 | 1/1992 | Sarpeshkar et al ................ 528/59 |
| 5,151,470 | 9/1992 | Sanders et al. ................ 528/407 |
| 5,231,217 | 7/1993 | Yeater et al. . |
| 5,356,946 | 10/1994 | Mafoti et al. ................ 528/75 |

OTHER PUBLICATIONS

A. Awater, "PU cast elastomers" in Polyurethane Handbook, ed. G. Oertel (N.Y.: Hanser Publishers, pp. 372–388 Dec. 1985.

J. H. Sanders and K. C. Frisch, "Urethane Elastomers" in Polyurethanes Chemistry and Technology (N.Y.: Interscience Publishers, pp. 273–314, Dec. 1962.

*Primary Examiner*—James J. Seidleck
*Assistant Examiner*—John M. Cooney, Jr.
*Attorney, Agent, or Firm*—Joseph C. Gil; Richard E. L. Henderson

[57] ABSTRACT

This invention relates to a process for preparing polyurethane elastomers comprising reacting in an open mold at an isocyanate index of about 90 to about 110

(a) an isocyanate prepolymer having an isocyanate content of about 2 to about 15% by weight and a molecular weight of from about 500 to about 5000 prepared by reaction of
  (i) at least one organic polyisocyanate with
  (ii) at least one isocyanate-reactive compound having at least two isocyanate-reactive groups and a molecular weight of from about 250 to about 4000;

with (b) certain aminocrotonate-terminated polyethers having a molecular weight of from about 500 to about 1500;
(c) optional chain extenders and/or crosslinkers other than aminocrotonate-terminated polyether (b); and
(d) optional auxiliaries and/or additives.

11 Claims, No Drawings

PREPARATION OF CAST ELASTOMERS USING AMINOCROTONATE-TERMINATED POLYETHER CHAIN EXTENDERS

BACKGROUND OF THE INVENTION

This invention relates to a process for preparing polyurethane cast elastomers by chain extending an isocyanate prepolymer with aminocrotonate-terminated polyethers.

The casting of polyurethane elastomers in open molds is known. E.g., A. Awater, "PU cast elastomers" in *Polyurethane Handbook*, ed. G. Oertel (New York: Hanser Publishers, 1985), pages 372–388; J. H. Saunders and K. C. Frisch, "Urethane Elastomers" in *Polyurethanes Chemistry and Technology* (New York: Interscience Publishers, 1962), pages 273–314. Chain extenders used in the preparation of polyurethane cast elastomers include low molecular weight diamines (particularly aromatic diamines) and glycols (particularly 1,4-butanediol). Suitable hydroxyl-containing chain extenders also include low molecular weight polymeric diols such as polyether, polyester, polyacetal, polycarbonate, polyesterether, polythioether, polyamide, and polyesteramide diols (especially polyether and polyester diols). E.g., U.S. Pat. Nos. 5,079,327, 5,079,328, 5,081,204, and 5,081,210.

Aminocrotonate-terminated polyethers are known. E.g., U.S. Pat. Nos. 3,666,726, 5,066,824, 5,151,470, and 5,231,217. However, aminocrotonate-terminated polyethers have most typically been used for reaction injection molding, in which relatively rapid reaction of isocyanate components with isocyanate-reactive components is desired. E.g., U.S. Pat. No. 5,356,946 and application Ser. No. 07/699,592 (filed May 14, 1991) which is now U.S. Pat. No. 5,160,308. Such reactivities are not generally considered suitable for preparing cast elastomers in open molds. In addition, the use of low molecular weight aminocrotonate-terminated polyethers as chain extenders or crosslinkers has not been disclosed.

It was an object of the present invention to obtain cast elastomers based on aminocrotonate-terminated polyether chain extenders and/or crosslinkers having improved mechanical properties. It has been found that polyurethane elastomers prepared using aminocrotonate-terminated polyethers exhibit good tear strength, tensile strength, and elongation properties, along with excellent thermal properties.

SUMMARY OF THE INVENTION

This invention relates to a process for preparing polyurethane elastomers comprising reacting in an open mold at an isocyanate index of about 90 to about 110

(a) an isocyanate prepolymer having an isocyanate content of about 2 to about 15% by weight (preferably 4 to 10% by weight) and having a molecular weight of from about 500 to about 5000 (preferably 1000 to 2200), wherein said isocyanate prepolymer is a reaction product of
  (i) at least one organic polyisocyanate with
  (ii) at least one isocyanate-reactive compound having at least two isocyanate-reactive groups and having a molecular weight of from about 250 to about 4000;
with (b) an aminocrotonate-terminated polyether having a molecular weight of from about 500 to about 1500 (preferably 600 to 1200) and having the formula (I)

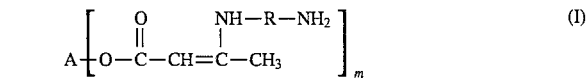

wherein
  A is the m-functional group left by the removal of the hydroxyl groups of a polyether polyol having a molecular weight of from about 150 to about 800,
  R is the difunctional residue of an organic diamine having the formula $H_2N-R-NH_2$ such that each free $-NH_2$ group of the aminocrotonate-terminated polyether (b) has a sufficiently moderated reactivity toward isocyanate prepolymer (a) to allow the preparation of a polyurethane elastomer in an open mold, and
  m is a number of from 2 to 8 (preferably 2 or 3 and more preferably 2); and
(c) 0 to about 10 percent by weight (preferably 0 to 5 percent by weight), relative to aminocrotonate-terminated polyether (b), of a chain extender and/or crosslinker other than aminocrotonate-terminated polyether (b) and having two isocyanate-reactive hydrogen atoms and a molecular weight of from 32 to about 250;
optionally in the presence of
(d) one or more auxiliaries and/or additives.

DETAILED DESCRIPTION OF THE INVENTION

Suitable isocyanate prepolymers (a) according to the invention have an isocyanate content of about 2 to about 15% by weight and a molecular weight of from about 500 to about 5000. Particularly preferred isocyanate prepolymers (a) have an isocyanate content of 4 to 10% by weight and a molecular weight of from 1000 to 2200.

Suitable polyisocyanates (a)(i) used for the preparation of isocyanate prepolymers (a) include aliphatic, cycloaliphatic, araliphatic, aromatic, and heterocyclic polyisocyanates of the type described, for example, by W. Siefken in *Justus Liebigs Annalen der Chemie*, 562, pages 75 to 136. Such polyisocyanates include those having the formula $Q(NCO)_n$ in which n is a number from 2 to about 5 (preferably 2 to 3 and more preferably 2) and Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an araliphatic hydrocarbon group containing 8 to 15 (preferably 8 to 13) carbon atoms, or an aromatic hydrocarbon group containing 6 to about 15 (preferably 6 to 13) carbon atoms. Examples of suitable isocyanates include ethylene diisocyanate; 1,4-tetramethylene diisocyanate; 1,6-hexamethylene diisocyanate; 1,12-dodecane diisocyanate; cyclobutane- 1,3-diisocyanate; cyclohexane-1,3- and -1,4-diisocyanate, and mixtures of these isomers; 1-isocyanato-3,3,5-trimethyl-5-isocyanatomethylcyclohexane ("isophorone diisocyanate"; see, e.g. German Auslegeschrift 1,202,785 and U.S. Pat. No. 3,401,190); 2,4- and 2,6-hexahydrotoluene diisocyanate and mixtures of these isomers; hexahydro-1,3- and/or -1,4-phenylene diisocyanate; dicyclohexylmethane-4,4'-diisocyanate ("hydrogenated MDI", or "HMDI"); 1,3- and 1,4-phenylene diisocyanate; 2,4- and 2,6-toluene diisocyanate and mixtures of these isomers ("TDI"); diphenyl-methane- 2,4'- and/or -4,4'-diisocyanate ("MDI"); naphthylene-1,5-diisocyanate; triphenyimethane-4,4',4"-triisocyanate; polyphenyl-polymethylene-polyisocyanates of the type which may be obtained by condensing aniline with formaldehyde, followed by phosgenation ("crude MDI"), which are described, for example, in British Patents 878,430 and 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3, 152,162; modified polyisocyanates containing urethane groups of the type described, for example, in U.S. Pat. Nos. 3,394,164 and 3,644,457; modified polyisocyanates containing allophanate groups of the type described, for example, in British Patent 994,890, Belgian Patent 761,616, and published Dutch Patent Application 7,102,524; modified polyisocyanates containing isocyanurate groups of the type described, for example, in U.S. Pat. No. 3,002,973, German Patentschriften 1,022,789, 1,222, 067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201, 372, and in British Patent 889,050; polyisocyanates obtained by telomerization reactions of the type described, for example, in U.S. Pat. No. 3,654,106; polyisocyanates containing ester groups of the type described, for example, in British Patents 965,474 and 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. It is also possible to use mixtures of the polyisocyanates described above. Dicyclohexylmethane-4,4'-diisocyanate is particularly preferred.

Suitable isocyanate-reactive compounds (a)(ii) used for the preparation of isocyanate prepolymers (a) according to the invention include compounds having a molecular weight of from about 250 to about 4000 and containing at least two isocyanate-reactive groups such as hydroxyl groups, amino groups, thiol groups, carboxyl groups, or a combination thereof, the preferred compounds being those containing hydroxyl groups. Such compounds are described, for example, in German Offenlegungsschrift 2,832,253 at pages 11 to 20.

Particularly preferred isocyanate-reactive compounds for use as component (a)(ii) contain two hydroxyl groups and have a molecular weight of from 250 to 4000 (most preferably from 1000 to 3000), including for example, hydroxyl-containing polyethers, polyesters, polyacetals, polycarbonates, polyesterethers, polythioethers, polyamides, polyesteramides, polysiloxanes, polybutadienes, and polyacetones, and can optionally contain one or more isocyanate-reactive amino groups. Particularly preferred hydroxyl-containing compounds include polyester or polyether diols, especially those having a molecular weight of from 1000 to 3000.

Suitable hydroxyl-containing polyesters for use as component (a)(ii) include reaction products of polyhydric alcohols (preferably diols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic, or heterocyclic and may be substituted, e.g., by halogen atoms, and/or unsaturated. Suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, dimethyl terephthalic, and terephthalic acid bis-glycol esters. Suitable polyhydric alcohols include ethylene glycol, 1,2- and 1,3-propanediol, 2-methyl-1,3-propanediol, 1,4- and 2,3-butane diol, 1,6-hexanediol, 1,8-octanediol, neopentyl glycol, cyclohexanedimethanol, 1,4-bis(hydroxymethyl)cyclohexane, glycerol, trimethylolpropane, 1,2,6-hexanetriol, 1,2,4-butanetriol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, and polybutylene glycols. The polyesters may also contain a proportion of carboxyl end groups. Polyesters of lactones, such as ε-caprolactone, or of hydroxycarboxylic acids, such as ω-hydroxycaproic acid, may also be used. Hydrolytically stable polyesters are preferably used in order to obtain the greatest benefit relative to the hydrolyric stability of the final product. Preferred polyesters include polyesters obtained from adipic acid or isophthalic acid and straight chained or branched diols, as well as lactone polyesters, preferably those based on caprolactone and diols. Particularly preferred polyesters are those based on adipic acid and diols such as those described above.

Suitable hydroxyl-containing polyethers for use as component (a)(ii) can be prepared, for example, by the polymerization of epoxides such as ethylene oxide, propylene oxide, butylene oxide, tetrahydrofuran, styrene oxide, or epichlorohydrin, optionally in the presence of $BF_3$, or by the chemical addition of such epoxides, optionally as mixtures or successively, to starting components containing reactive hydrogen atoms, such as water, alcohols, or amines. Examples of such starting components include ethylene glycol, 1,3- or 1,2-propanediol, 1,2-, 1,3-, or 1,4-butanediol, trimethylolpropane, 4,4'-dihydroxydiphenylpropane, aniline, ammonia, ethanolamine, or ethylene diamine. Sucrose polyethers of the type described, for example, in German Auslegeschriften 1,176,358 and 1,064,938 may also be used according to the invention. Polyethers that contain predominantly primary hydroxyl groups (up to about 90% by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patentschrift 1,152, 536) are also suitable, as are polybutadienes containing hydroxyl groups. Particularly preferred polyethers include polyoxyalkylene polyether polyols, such as polyoxyethylene diol, polyoxypropylene diol, polyoxybutylene diol, and polytetramethylene diol.

Suitable polyacetals for use as component (a)(ii) include compounds obtained from the condensation of glycols, such as diethylene glycol, triethylene glycol, 4,4'-dihydroxydiphenylmethane, and hexanediol, with formaldehyde or by the polymerization of cyclic acetals, such as trioxane.

Suitable polycarbonates for use as component (a)(ii) include those prepared by the reaction of diols, such as 1,3-propanediol, 1,4-butanediol, 1,6-hexanediol, diethylene glycol, triethylene glycol, tetraethylene glycol, or thiodiglycol, with phosgene or diaryl carbonates such as diphenyl carbonate (German Auslegeschriften 1,694,080, 1,915,908, and 2,221,751; German Offenlegungsschrift 2,605,024).

Suitable polythioethers for use as component (a)(ii) include the condensation products obtained by the reaction of thiodiglycol, either alone or with other glycols, dicarboxylic acids, formaldehyde, aminocarboxylic acids, or amino alcohols. The products obtained are polythio-mixed ethers, polythioether esters, or polythioether ester amides, depending on the components used.

Suitable polyester amides and polyamides for use as component (a)(ii) include, for example, the predominantly linear condensates prepared from polybasic saturated and unsaturated carboxylic acids or the anhydrides thereof and polyvalent saturated or unsaturated amino alcohols, diamines, polyamines, and mixtures thereof.

Other suitable hydroxyl-containing compounds (a)(ii) include polyhydroxyl compounds already containing urethane or urea groups and modified or unmodified natural polyols. Products of addition of alkylene oxides to phenol-formaldehyde resins or to urea-formaldehyde resins are also suitable. Furthermore, amide groups may be introduced into the polyhydroxyl compounds as described, for example, in German Offenlegungsschrift 2,559,372.

Polyhydroxyl compounds in which polyadducts or polycondensates or polymers are present in a finely dispersed or dissolved form may also be used as component (a)(ii) according to the invention, provided that the molecular weights of from about 250 to about 4000. Polyhydroxyl compounds of this type may be obtained, for example, by carrying out polyaddition reactions (e.g., reactions between polyisocyanates and amino functional compounds) or polycondensation reactions (e.g., between formaldehyde and phenols or amines) in situ in the above-mentioned hydroxyl-containing compounds. Processes of this type are described, for example, in German Auslegeschriften 1,168,075 and 1,260,142 and German Offenlegungsschriften 2,324,134, 2,423,984, 2,512,385, 2,513,815, 2,550,796, 2,550,797, 2,550,833, 2,550,862, 2,633,293, and 2,639,254. Suitable compounds may also be obtained according to U.S. Pat. Nos. 3,869,413 or 2,550,860 by mixing a previously prepared aqueous polymer dispersion with a polyhydroxyl compound and then removing water from the mixture.

Polyhydroxyl compounds modified with vinyl polymers, such as those obtained, for example, by the polymerization of styrene and acrylonitrile in the presence of polycarbonate polyols (German Patentschrift 1,769,795 and U.S. Pat. No. 3,637,909) are also suitable for use as component (a)(ii) of the invention. Synthetic resins with exceptional flame resistance may be obtained by using polyether polyols that have been modified by graft polymerization with vinyl phosphonic add esters and optionally acrylonitrile, methacrylonitrile, acrylamide, methacrylamide, or hydroxy-functionalized acrylic or methacrylic acid esters according to German Offenlegungsschriften 2,442,101, 2,644,922, and 2,646,141.

Suitable, although less preferred, hydroxyl-containing compounds (a)(ii) include organofunctional polysiloxanes containing two terminal isocyanate-reactive groups and structural units of the formula -O-Si(R)$_3$ in which R denotes a $C_1$–$C_4$ alkyl group or a phenyl group, preferably a methyl group. Both the known, pure polysiloxanes containing organo-functional end groups and the known siloxane polyoxyalkylene copolymers containing organofunctional end groups are suitable starting materials according to the invention.

General discussions of representative hydroxyl-containing compounds that may be used according to the present invention can be found, for example, in *Polyurethanes, Chemistry and Technology* by Saunders and Frisch, Interscience Publishers, New York, London, Volume I, 1962, pages 32–42 and pages 44–54, and Volume II, 1964, pages 5–6 and 198–199, and in *Kunststoff-Handbuch,* Volume VII, Vieweg-Höchtlen, Carl-Hanser-Verlag, Munich, 1966, on pages 45 to 71.

Also suitable for use as component (a)(ii) are so-called amine-terminated polyethers containing primary or secondary (preferably primary) aromatically or aliphatically (preferably aliphatically) bound amino groups and having a molecular weight of from about 800 to about 5000. Compounds containing amino end groups can also be attached to the polyether chain through urethane or ester groups. These amine-terminated polyethers can be prepared by any of several methods known in the art. For example, amine-terminated polyethers can be prepared from polyhydroxyl polyethers (e.g., polypropylene glycol ethers) by a reaction with ammonia in the presence of Raney nickel and hydrogen (Belgian Patent 634,741). Polyoxyalkylene polyamines can be prepared by a reaction of the corresponding polyol with ammonia and hydrogen in the presence of a nickel, copper, chromium catalyst (U.S. Pat. No. 3,654,370). The preparation of polyethers containing amino end groups by hydrogenation of cyanoethylated polyoxypropylene ethers is described in German Patentschrift 1,193,671. Other methods for the preparation of polyoxyalkylene (polyether) amines are described in U.S. Pat. Nos. 3,155,728 and 3,236,895 and in French Patent 1,551,605. French Patent 1,466,708 discloses the preparation of polyethers containing secondary amino end groups. Also useful are the polyether polyamines described in U.S. Pat. Nos. 4,396,729, 4,433,067, 4,444,910, and 4,530,941.

Relatively high molecular weight polyhydroxy-polyethers suitable for the process of the present invention may be converted into the corresponding anthranilic acid esters by reaction with isatoic acid anhydride. Methods for making polyethers containing aromatic amino end groups are disclosed in German Offenlegungsschriften 2,019,432 and 2,619,840 and U.S. Pat. Nos. 3,808,250, 3,975,428, and 4,016,143. Relatively high molecular weight compounds containing amino end groups may also be obtained according to German Offenlegungsschrift 2,546,536 or U.S. Pat. No. 3,865,791 by reacting isocyanate prepolymers based on polyhydroxyl polyethers with hydroxyl-containing enamines, aldimines, or ketimines and hydrolyzing the reaction product.

Aminopolyethers obtained by the hydrolysis of compounds containing isocyanate end groups are preferred amine-terminated polyethers for use as component (a)(ii). For example, in a process disclosed in German Offenlegungsschrift 2,948,419, polyethers containing hydroxyl groups (preferably two or three hydroxyl groups) react with polyisocyanates to form isocyanate prepolymers whose isocyanate groups are then hydrolyzed in a second step to amino groups. Preferred amine-terminated polyethers are prepared by hydrolyzing an isocyanate compound having an isocyanate group content of from 0.5 to 40% by weight. More preferred polyethers are prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine-terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500, and 4,565,645, European Patent Application 97,299, and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, 4,931,595, and 5,283,364.

Suitable amine-terminated polyethers for use as component (a)(ii) also include aminophenoxy-substituted polyethers described, for example, in European Patent Applications 288,825 and 268,849.

Suitable amine-terminated polyethers for use as component (a)(ii) also include aminocrotonate-terminated polyethers having a molecular weight of from about 500 to about 5000. Such aminocrotonate-terminated polyethers can be prepared by known methods from acetoacetate-modified polyether precursors, which can in turn be prepared by known methods from suitable polyether polyols. E.g., U.S. Pat. Nos. 3,666,726, 3,691,112, 5,066,824, 5,151,470, and 5,231,217; see also U.S. application Ser. Nos. 07/699,592 (filed May 14, 1991) now U.S. Pat. No. 5,160,308 and 07/805,735 (filed Dec. 9, 1991) now U.S. Pat. No. 5,356,946.

It is, of course, possible to use mixtures of the above-mentioned isocyanate-reactive compounds as component (a)(ii) of the invention.

Low molecular weight aminocrotonate-terminated polyethers for use as component (b) can be prepared by known methods from acetoacetate-modified polyether precursors, which can in turn be prepared by known methods from suitable polyether polyols. E.g., U.S. Pat. Nos. 3,666,726, 3,691,112, 5,066,824, 5,151,470, and 5,231,217; see also U.S. application Ser. Nos. 07/699,592 (filed May 14, 1991) now U.S. Pat. No. 5,160,308 and 07/805,735 (filed Dec. 9, 1991) now U.S. Pat. No. 5,356,946. In general, difunctional aminocrotonate-terminated polyethers (in which m of formula (I) is 2) are referred to as chain extenders, whereas higher functionality amino-crotonate-terminated polyethers are referred to as crosslinkers.

Suitable hydroxyl-containing polyethers for the preparation of the acetoacetate-modified polyether precursors are known and may be prepared, for example, by the polymerization of epoxides such as ethylene oxide, propylene oxide, butylene oxide, tetrahydrofuran, styrene oxide, or epichlorohydrin, optionally in the presence of $BF_3$, or by chemical addition of such epoxides, optionally as mixtures or successively, to starting components containing reactive hydrogen atoms, such as water, alcohols, or amines. Examples of such starting components include ethylene glycol, 1,2- or 1,3-propanediol, 1,2-, 1,3-, or 1,4-butanediol, trimethylolpropane, 4,4'-dihydroxydiphenylpropane, aniline, ammonia, ethanolamine, or ethylene diamine. Sucrose polyethers of the type described, for example, in German Auslegeschriften 1,176,358 and 1,064,938 may also be used according to the invention. Polyethers that contain predominantly primary hydroxyl groups (up to about 90% by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patentschrift 1,152,536) are also suitable, as are polybutadienes containing hydroxyl groups. Particularly preferred polyethers include polyoxyalkylene polyether polyols, such as polyoxyethylene diol, polyoxypropylene diol, polyoxybutylene diol, and polytetramethylene diol. Corresponding polythioethers, although generally less preferred, are also suitable.

Acetoacetylation of such polyether polyols gives acetoacetate-modified polyether precursors having the general formula (II)

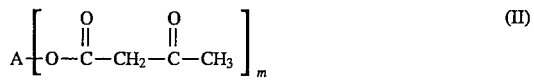

wherein A is the m-functional group left by the removal of the hydroxyl groups of a polyether polyol having a molecular weight of from about 150 to about 800, and m is a number of from 2 to 8 (preferably 2 or 3, more preferably 2). The molecular weight of the polyether polyol from which group A is derived is, of course, selected such that the ultimately formed aminocrotonate-terminated polyether has a molecular weight of about 500 to about 1500. Acetoacetylation is preferably carried out by transesterifying the polyols described above with at least a molar equivalent of a $C_1$–$C_6$ alkyl acetoacetate, such as methyl acetoacetate, ethyl acetoacetate, propyl acetoacetate, and, preferably, t-butyl acetoacetate, preferably in the presence of a transesterification catalyst.

The acetoacetate-modified polyether precursors are converted to aminocrotonate-terminated polyethers of this invention by reaction with suitable diamines having the formula $H_2N$-R-$NH_2$, optionally in the presence of a suitable acid catalyst. Suitable diamines have one amino group that reacts with the acetoacetate-modified polyether precursor and a second amino group that, after the aminocrotonate-terminated polyether is formed, exhibits a reactivity toward isocyanate groups that is sufficiently attenuated to allow the preparation of cast elastomers in an open mold. The amino group that reacts initially with the acetoacetate-modified polyether precursor need not have such attenuated reactivity, but if it does exhibit attenuated reactivity, a catalyst is generally used. Reactivities of the attenuated-reactivity amino groups can be moderated either by steric effects or by electronic effects. Examples of suitable diamines $H_2N$-R-$NH_2$ include (1) substituted aromatic diamines in which one or more aromatic ring substituents (preferably $C_1$–$C_6$ alkyl groups) are situated ortho to the amino groups that give rise to reactive amino groups of the aminocrotonate-terminated polyethers, such as 1-methyl- 3,5-bis(methylthio)-2,4- and/or -2,6-diaminobenzene, 1,3,5-triethyl-2,4-diaminobenzene, 1,3,5-triisopropyl-2,4-diaminobenzene, 1-methyl-3,5-diethyl- 2,4- and/or -2,6-diaminobenzene ("DETDA"), 4,6-dimethyl-2-ethyl- 1,3-diaminobenzene, 3,5,3',5'-tetraethyl-4,4-diaminodiphenylmethane, 3,5,3',5'-tetraisopropyl-4,4'-diaminodiphenylmethane, and 3,5-diethyl-3',5'-diisopropyl-4,4'-diaminodiphenylmethane; (2) other aromatic diamines in which the reduced reactivity of the amino groups giving rise to the reactive amino groups of the aminocrotonate-terminated polyethers is due primarily to electronic effects rather than steric factors, such as halogenated diaminodiphenylmethanes (for example, 3,3'-dichloro-4,4'-diaminodiphenylmethane ("MOCA") and 3-chloro-4,4'-diaminodiphenylmethane (in which the amino group attached to the chlorinated aromatic ring is left exposed)), and 4-(4'-aminobenzyl)cyclohexylamine ("½ PACM") (in which the non-aromatic amino group reacts preferentially with the acetoacetate group and the aromatic amino group is left exposed); and (3) sterically hindered non-aromatic aliamines, especially substituted $C_2$–$C_{10}$ aliphatic or $C_5$–$C_8$ cycloaliphatic diamines, preferably 1-alkylated alkanediamines.

Suitable acidic catalysts for the preparation of the aminocrotonate-terminated polyethers (b) from the corresponding acetoacetate-modified polyether precursors, if used at all, include boron trifluoride etherate and organic acids having $pK_a$ values of from 0.1 to 0.8, such as trifluoroacetic acid and p-toluenesulfonic acid. Although solvents are not essential for the preparation of at least some aminocrotonate-terminated polyethers, solvents are generally preferred, especially solvents that form azeotropes with water. Suitable solvents include dichloromethane, chloroform, chlorobenzene, dichlorobenzenes, toluene, xylenes, ethyl acetate, propyl acetate, butyl acetate, diethyl ether, dibutyl ether, and the like.

Low molecular weight aminocrotonate-terminated polyethers (b) are generally the only chain extenders and/or crosslinkers used in the process of the invention. It is, however, also possible to use up to about 10 percent by weight (preferably up to 5 percent by weight), relative to component (b), of chain extenders and/or crosslinkers (c) other than the aminocrotonate-terminated polyethers. Such additional chain extenders and/or crosslinkers (if used at all) include compounds having two or more isocyanate-reactive hydrogen atoms and having a molecular weight of from 32 to 399. Such compounds contain hydroxyl groups, amino groups, and/or thiol groups and generally contain 2 to 8 (preferably 2 to 4) isocyanate-reactive hydrogen atoms. Although hydroxyl-containing chain extenders and crosslinkers can be used, chain extenders and crosslinkers containing amino groups are preferred. The preferred amine chain extenders contain exclusively aromatically bound primary or secondary (preferably primary) amino groups and preferably also contain alkyl substituents. Examples of such aliamines include 1,4-diaminobenzene, 2,4-diaminotoluene, 2,4'- and/or 4,4'-diaminodiphenylmethane, 3,3'-dimethyl-4,4'-diaminodiphenylmethane, 3,3'-dichloro-4,4'-diaminodiphenylmethane ("MOCA"), 1-methyl-3,5-bis(methylthio)-2,4- and/or -2,6-diaminobenzene, 1,3,5-triethyl-2,4-diaminobenzene, 1,3,5-triisopropyl-2,4-diaminobenzene, 1-methyl-3,5-diethyl-2,4- and/or -2,6-diaminobenzene, 4,6-dimethyl-2-ethyl-1,3-diaminobenzene, 3,5,3',5'-tetraethyl-4,4-diaminodiphenylmethane, 3,5,3',5'-tetraisopropyl-4,4'-diaminodiphenylmethane, and 3,5-diethyl-3',5'-diisopropyl-4,4'-diaminodiphenylmethane. Such diamines may, of course, also be used as mixtures. It is particularly preferred to use 1-methyl-3,5-diethyl-2,4-diaminobenzene or a mixture of this compound with 1-methyl-3,5-diethyl-2,6-diaminobenzene. The less-preferred hydroxyl-containing chain extenders and crosslinkers include glycols and polyols, such as 1,2-ethanediol, 1,2- and 1,3-propylene glycol, 1,4- and 2,3-butylene glycol, 1,6-hexanediol, 1,8-octanediol, neopentyl glycol, cyclohexanedimethanol, 1-methyl-1,3-propanediol, 2-methyl-1,3-propanediol, glycerol, trimethylolpropane, 1,2,6-hexanetriol, 1,2,4-butanetriol, and trimethylolethane.

It is also possible, but generally not preferred, use chain extenders and/or crosslinkers in admixture with higher molecular weight isocyanate-reactive components for reaction with the isocyanate prepolymers.

Auxiliary agents and/or additives may optionally also be used in the process of the invention. Suitable auxiliary agents and/or additives (d) may include, for example, internal mold release agents, catalysts for the polyisocyanate-polyaddition reaction, blowing agents, surface-active additives, cell regulators, pigments, dyes, UV stabilizers, plasticizers, fungistatic or bacteriostatic substances, and fillers, such as those described in European Patent Application 81,701 at column 6, line 40, to column 9, line 31. When used, the preferred auxiliary agents and additives include known fillers and/or reinforcing substances, such as barium sulfate, kieselguhr, whiting, mica, and especially glass fibers, liquid crystal fibers, glass flakes, glass balls, aramide fibers, and carbon fibers. These fillers and/or reinforcing materials may be added in quantities of up to about 20% by weight (preferably up to 10% by weight) based on the total quantity of filled or reinforced product.

Catalysts, although generally not necessary, can sometimes be desirable in the process of the invention. Suitable catalysts (d) include tertiary amines and organic metal compounds (especially organic tin compounds) known in the art and, if used at all, are generally used in a quantity ranging from about 0.01 to about 0.5% by weight, based on the total quantity of isocyanate-reactive components (b) and (c).

The process of the invention can be carried out using the prepolymer or semiprepolymer process. In the prepolymer method, a prepolymer is formed by reacting the polyisocyanate with a portion of the isocyanate-reactive components. It is possible, although less preferred, to mix a portion of the aminocrotonate-terminated polyether with the isocyanate-reactive component as long as the specified amount is always used as a chain extender. The prepolymer is then mixed with chain extender (b) and allowed to react in a suitable open mold. Suitable mold materials include metals (for example, aluminum) or plastics (for example, epoxide resin). External release agents, such as silicone oils, are often used during the molding process. It is, however, also possible to use so-called "internal release agents", optionally in admixture with external release agents, as described, for example, in German Offenlegungsschriften 2,121,670 and 2,307,589.

The less preferred semiprepolymer method is similar to the prepolymer method except that a portion of the organic polyisocyanate remains unreacted. That is, the isocyanate component is a mixture of unreacted polyisocyanate and true prepolymer. As in the prepolymer method, the semiprepolymer is allowed to react with the chain extender to form the polyurethane elastomer product.

When carrying out the process of the present invention, the quantity of polyisocyanate prepolymer should preferably be such that the isocyanate index is from 90 to 110, preferably 100 to 105. By "isocyanate index" is meant the quotient of the number of isocyanate groups divided by the number of isocyanate-reactive groups, multiplied by 100.

The in-mold reaction is generally carried out in heated mold at a temperature of about 80° C. to about 130° C., preferably 90° C. to 110° C. After the polymer-forming reaction is complete, the resultant elastomers are post-cured, typically at a temperature of about 90° C. to about 120° C.

Elastomers prepared according to the invention using aminocrotonate-terminated polyethers as the chain extenders exhibit excellent mechanical properties, particularly with respect to tear strength, tensile strength, and elongation properties, as well as thermal properties.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Examples 1–6 Preparation of aminocrotonate-terminated products

Example 1

A mixture of 4000 g of tripropylene glycol and 6583 g of t-butyl acetoacetate were stirred under nitrogen gas at 200° C. t-Butyl alcohol was collected at atmospheric pressure and then under vacuum until a total of 3057 g was collected. A 2500 g portion of the resultant acetoacetylated tripropylene glycol was heated under nitrogen gas at 60° C. and 2393 g of 4-(4-aminobenzyl)cyclohexylamine ("½ PACM") was slowly added. After the temperature was raised to 110° C., water was collected at atmospheric pressure and then under vacuum until a total of 175 g was collected. The resultant aminocrotonate-terminated product, which had a functionality of 1.7 and an equivalent weight of 399.1, was used without further purification in subsequent reactions.

Example 2

The procedure of Example 1 was repeated except that the second reaction step was carried out using 2088 g of a mixture containing 80% by weight of 1-methyl-3,5-diethyl-2,4-diaminobenzene and 20% by weight of 1-methyl-3,5-diethyl-2,6-diaminobenzene ("DETDA") in the presence of 1 g of trifluoroacetic acid as catalyst. A total of 175 g of water was collected in the second step. The resultant aminocrotonate-terminated product, which had a functionality of 1.7 and an equivalent weight of 373.1, was used without further purification in subsequent reactions.

Example 3

The procedure of Example 1 was repeated except that the first reaction step was carried out using 6000 g of a propylene-glycol-started polyether of propylene oxide having a hydroxyl number of 224 (available as MULTRANOL® 9121 from Miles Inc.) and 4466 g of t-butyl acetoacetate (giving 2089 g of t-butyl alcohol) and the second reaction step was carried out using 2500 g of the resultant acetoacetylated polyether and 1457 g of 4-(4-aminobenzyl)cyclohexylamine (giving 81 g of water). The resultant aminocrotonate-terminated polyether, which had an amine functionality of 1.7 and an equivalent weight of 536, was used without further purification in subsequent reactions.

Example 4

The procedure of Example 1 was repeated except that the second reaction step was carried out using 2500 g of the acetoacetylated polyether intermediate of Example 3 and 1271 g of a mixture containing 80% by weight of 1-methyl-3,5-diethyl-2,4-diaminobenzene and 20% by weight of 1-methyl-3,5-diethyl-2,6-diaminobenzene in the presence of 1 g of trifluoroacetic acid as catalyst. A total of 77 g of water was collected in the second step. The resultant aminocrotonate-terminated polyether, which had an amine functionality of 1.7 and an equivalent weight of 510, was used without further purification in subsequent reactions.

Example 5

The procedure of Example 1 was repeated except that the first reaction step was carried out using 1000 g of a trimethylolpropane-started polyether of propylene oxide having a hydroxyl number of 370 (available as MULTRANOL® 4012 from Miles Inc.) and 886 g of t-butyl acetoacetate (giving 414 g of t-butyl alcohol) and the second reaction step was carried out using 669 g of the resultant acetoacetylated polyether and 520 g of 4-(4-aminobenzyl)cyclohexylamine (giving 44 g of water). The resultant aminocrotonate-terminated polyether, which had an amine functionality of 2.55 and an equivalent weight of 448.6, was used without further purification in subsequent reactions.

Example 6

The procedure of Example 1 was repeated except that the second reaction step was carried out using 669 g of the acetoacetylated polyether intermediate of Example 5 and 453 g of a mixture containing 80% by weight of 1-methyl-3,5-diethyl-2,4-diaminobenzene and 20% by weight of 1-methyl-3,5-diethyl-2,6-diaminobenzene in the presence of I g of trifluoroacetic acid as catalyst. A total of 19 g of water was collected in the second step. The resultant aminocrotonate-terminated polyether, which had an amine functionality of 2.55 and an equivalent weight of 422.6, was used without further purification in subsequent reactions.

Example 7–12 Preparation of cast elastomers

Examples 7 to 12 describe the preparation of cast elastomers using the aminocrotonate-terminated products of Examples 1–6 as chain extender (but not as a component of the isocyanate prepolymer) and an isocyanate prepolymer based on dicyclohexylmethane-4,4'-diisocyanate ("HMDI"). The isocyanate prepolymer was a reaction product of dicyclohexylmethane- 4,4'-diisocyanate with a polyoxypropylene glycol (molecular weight of 2000) having an isocyanate content of about 9.7%.

Example 7

The aminocrotonate-terminated product of Example 1 (75.8 g) and the HMDI-based isocyanate prepolymer (100 g) were separately warmed to about 90° C. and degassed in an oven. The reactants were carefully combined to avoid introducing bubbles and rapidly stirred for about ten seconds. A portion of the reaction mixture was poured into a preheated (110° C.) 4-mm rectangular mold that had been treated with a silicone mold release and, after the mold was clamped shut, heated at 110° C. for one hour. A second portion of the reaction mixture was poured into a preheated (110° C.) compression set button mold that had been treated with a silicone mold release and also heated in at 110° C. for one hour. The molded parts were carefully removed from the molds and allowed to cool on a flat surface. Physical properties are shown in Table 1.

Example 8

The procedure of Example 7 was repeated using 70.8 g of the aminocrotonate-terminated product of Example 2. Physical properties of the molded parts are shown in Table 1.

Example 9

The procedure of Example 7 was repeated using 101.8 g of the aminocrotonate-terminated polyether of Example 3. Physical properties of the molded parts are shown in Table 1.

Example 10

The procedure of Example 7 was repeated using 96.8 g of the aminocrotonate-terminated polyether of Example 4. Physical properties of the molded parts are shown in Table 1.

Example 11

The procedure of Example 7 was repeated using 85.2 g of the aminocrotonate-terminated polyether of Example 5. Physical properties of the molded parts are shown in Table 1.

Example 12

The procedure of Example 7 was repeated using 80.2 g of the aminocrotonate-terminated polyether of Example 6. Physical properties of the molded parts are shown in Table 1.

TABLE I

Properties of cast elastomers prepared according to Examples 7 to 12

| Die C tensile strength | Examples | | | | | |
|---|---|---|---|---|---|---|
| | 7 | 8 | 9 | 10 | 11 | 12 |
| Stress at failure (MPa) | 22.0 | 6.8 | 10.0 | 2.4 | 20.9 | 4.1 |
| Strain at failure (%) | 208 | 223 | 142 | 46 | 114 | 87 |
| Die C tear strength (N/mm) | 97.0 | 48.4 | 30.0 | 14.5 | 71.6 | 30.9 |
| Split tear strength (N/mm) | 35.2 | 28.7 | 10.9 | 4.1 | 22.7 | 11.5 |
| Compression set (%) | 96 | 100 | 86 | 106 | 90 | 97 |

What is claimed is:

1. A process for preparing polyurethane elastomers comprising reacting in an open mold at an isocyanate index of 90 to 110

(a) an isocyanate prepolymer having an isocyanate content of 2 to 15% by weight and having a molecular weight of from 500 to 5000, wherein said isocyanate prepolymer is a reaction product of
  (i) at least one organic polyisocyanate with
  (ii) at least one isocyanate-reactive compound having at least two isocyanate-reactive groups and having a molecular weight of from 1000 to 3000;

with (b) an aminocrotonate-terminated polyether having a molecular weight of from 500 to 1500 and having the formula

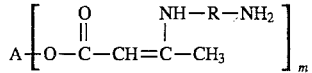

wherein
  A is the m-functional group left by the removal of the hydroxyl groups of a polyether polyol having a molecular weight of from 150 to 800,
  R is the difunctional residue of an organic diamine having the formula $H_2N$-R-$NH_2$ such that each free -$NH_2$ group of the aminocrotonate-terminated polyether (b) has a sufficiently moderated reactivity toward isocyanate prepolymer (a) to allow the preparation of a polyurethane elastomer in an open mold, and
  m is a number of from 2 to 8; and (c) 0 to about 10 percent by weight, relative to aminocrotonate-terminated polyether (b), of a chain extender and/or crosslinker other than aminocrotonate-terminated polyether (b) and having two isocyanate-reactive hydrogen atoms and a molecular weight of from 32 to 250;

optionally in the presence of
  (d) one or more catalysts and/or other auxiliaries or additives.

2. A process according to claim 1 wherein the organic polyisocyanate (a)(i) is dicyclohexylmethane-4,4'-diisocyanate.

3. A process according to claim 1 wherein the isocyanate-reactive compound (a)(ii) is a polyether diol.

4. A process according to claim 1 wherein the isocyanate prepolymer (a) has an isocyanate content of 4 to 10% by weight and has a molecular weight of from 1000 to 2200.

5. A process according to claim 1 wherein an aminocrotonate-terminated polyether (b) is the only chain extender used.

6. A process according to claim 1 wherein m is 2 or 3.

7. A process according to claim 1 wherein the am indoctrinate-terminated polyether has a molecular weight of from 500 to 1500 and has the formula

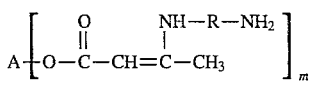

wherein
  A is the m-functional group left by the removal of the hydroxyl groups of a polyether polyol having a molecular weight of from 150 to 800,
  R is the difunctional residue of an organic diamine having the formula $H_2N$-R-$NH_2$ wherein said organic diamine is
    (1) a substituted aromatic diamine in which one or more aromatic ring substituents are situated ortho to the amino groups that give rise to the -$NH_2$ groups of the aminocrotonate-terminated polyethers, or
    (2) an aromatic diamine other than diamine (1) in which the reduced reactivity of the amino groups giving rise to the -$NH_2$ groups of the aminocrotonate-terminated polyethers is due primarily to electronic effects rather than steric factors,
such that each free -$NH_2$ group of the aminocrotonate-terminated polyether has a sufficiently moderated reactivity toward the organic polyisocyanate to allow the preparation of a polyurethane elastomer in an open mold.

8. A process according to claim 1 wherein R is the difunctional residue of a substituted aromatic diamine in which one or more $C_1$–$C_6$ alkyl groups are situated ortho to the amino groups that give rise to the -$NH_2$ groups of the aminocrotonate-terminated polyethers.

9. A process according to claim 1 wherein R is the difunctional residue of 1-methyl-3,5-diethyl-2,4- and/or -2,6-diaminobenzene.

10. A process according to claim 1 wherein R is the difunctional residue of 3,3'-dichloro-4,4'-diaminodiphenylmethane, 3-chloro- 4,4'-diaminodiphenylmethane, or 4-(4'-aminobenzyl)cyclohexylamine.

11. A process according to claim 1 additionally comprising (d) one or more auxiliaries and/or additives.

* * * * *